United States Patent
Shinozaki

(10) Patent No.: US 10,658,688 B2
(45) Date of Patent: May 19, 2020

(54) HUMIDIFIER AND FUEL CELL SYSTEM HAVING THE SAME

(71) Applicant: TOYOTA JIDOSHA KABUSHIKI KAISHA, Toyota-shi, Aichi-ken (JP)

(72) Inventor: Yoshihiro Shinozaki, Atsugi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 16/055,544

(22) Filed: Aug. 6, 2018

(65) Prior Publication Data

US 2019/0067717 A1    Feb. 28, 2019

(30) Foreign Application Priority Data

Aug. 30, 2017 (JP) ................. 2017-166080

(51) Int. Cl.
*H01M 8/06* (2016.01)
*H01M 8/04119* (2016.01)
*H01M 8/0432* (2016.01)
*H01M 8/04828* (2016.01)
*G01K 5/48* (2006.01)
*G01K 5/62* (2006.01)

(52) U.S. Cl.
CPC ..... *H01M 8/04149* (2013.01); *H01M 8/0432* (2013.01); *H01M 8/0435* (2013.01); *H01M 8/04141* (2013.01); *H01M 8/04835* (2013.01); *G01K 5/483* (2013.01); *G01K 5/62* (2013.01)

(58) Field of Classification Search
CPC .......... H01M 8/04149; H01M 8/0432; H01M 8/04835
See application file for complete search history.

(56) References Cited

U.S. PATENT DOCUMENTS

2011/0165478 A1    7/2011 Altmueller et al.

FOREIGN PATENT DOCUMENTS

| JP | 2006156203 A | 6/2006 |
| JP | 2007093192 A | 4/2007 |
| JP | 2007294347 A | 11/2007 |
| JP | 2008010306 A | 1/2008 |
| JP | 2008027674 A | 2/2008 |
| JP | 2008041335 A | 2/2008 |
| JP | 2011528845 A | 11/2011 |

*Primary Examiner* — Jane J Rhee
(74) *Attorney, Agent, or Firm* — Hunton Andrews Kurth LLP

(57) ABSTRACT

A humidifier includes: moisture permeable members each having a tubular shape; a case housing the moisture permeable members; a first flow path portion in which one of cathode gas to be supplied to a fuel cell and cathode off-gas discharged from the fuel cell flows inside the moisture permeable members; a second flow path portion in which the other of the cathode gas and the cathode off-gas flows outside the moisture permeable members within the case; and a temperature sensitive member attached to at least one of the moisture permeable members, deformable in response to temperature, and deforming so as to decrease a gap between the moisture permeable members as the temperature decreases.

6 Claims, 9 Drawing Sheets

HIGH-TEMPERATURE STATE

LOW-TEMPERATURE STATE

LOW-TEMPERATURE STATE

LOW-TEMPERATURE STATE

LOW-TEMPERATURE STATE

HIGH-TEMPERATURE STATE

HIGH-TEMPERATURE STATE

LOW-TEMPERATURE STATE

HIGH-TEMPERATURE STATE

LOW-TEMPERATURE STATE

LOW-TEMPERATURE STATE

LOW-TEMPERATURE STATE

HIGH-TEMPERATURE STATE

LOW-TEMPERATURE STATE

HUMIDIFIER AND FUEL CELL SYSTEM HAVING THE SAME

CROSS-REFERENCE TO RELATED APPLICATION

This application is based upon and claims the benefit of priority of the prior Japanese Patent Application No. 2017-166080, filed on Aug. 30, 2017, the entire contents of which are incorporated herein by reference.

FIELD OF THE INVENTION

The present invention relates to a humidifier and a fuel cell system having the same.

BACKGROUND

There is known a humidifier that humidifies cathode gas to be supplied to a fuel cell by use of moisture contained in cathode off-gas discharged from the fuel cell. Desirably, the humidification amount of the cathode gas is suitably adjusted. For example, if the humidification amount of the cathode gas by the humidifier is too large when the temperature of the fuel cell is relatively low, a large amount of condensed water might be generated in the fuel cell, so that flooding might occur. Further, if the humidification amount of the cathode gas is insufficient when the temperature of the fuel cell is relatively high, an electrolyte membrane of the fuel cell might be dried. For example, Japanese Unexamined Patent Application Publication No. 2006-156203 discloses: a bypass path for bypassing cathode off-gas from a humidifier; and a bypass valve for adjusting the bypass amount of the cathode off-gas.

The above-described bypass path and bypass valve are provided outside the humidifier, which might complicate an entire system and might increase a size thereof.

SUMMARY OF THE INVENTION

It is therefore an object of the present invention to provide a humidifier capable of suitably adjusting a humidification amount of cathode gas to be supplied to a fuel cell with a simple structure and a fuel cell system having the same.

The above object is achieved by a humidifier including: moisture permeable members each having a tubular shape; a case housing the moisture permeable members; a first flow path portion in which one of cathode gas to be supplied to a fuel cell and cathode off-gas discharged from the fuel cell flows inside the moisture permeable members; a second flow path portion in which the other of the cathode gas and the cathode off-gas flows outside the moisture permeable members within the case; and a temperature sensitive member attached to at least one of the moisture permeable members, deformable in response to temperature, and deforming so as to decrease a gap between the moisture permeable members as the temperature decreases.

The temperature of the temperature sensitive member attached to the moisture permeable member is influenced at least by the temperature of the cathode off-gas. Herein, when the temperature of the fuel cell is relatively high, the temperature of the cathode off-gas is also relatively high. When the temperature of the fuel cell is relatively low, the temperature of the cathode off-gas is also relatively low. Therefore, when the temperature of the fuel cell is relatively high, the temperature of the temperature sensitive member is also relatively high. When the temperature of the fuel cell is relatively low, the temperature of the temperature sensitive member is also relatively low. As described above, the temperature sensitive member is deformed so as to decrease a gap between the moisture permeable members as the temperature decreases. Therefore, when the temperature of the temperature-sensitive member decreases, the flow rate of the cathode gas or the cathode off-gas, which flows through the gap between the moisture permeable members, decreases. This also decreases the amount of moisture moving from the cathode off-gas to the cathode gas through the moisture permeable member. Accordingly, the humidification amount of the cathode gas decreases as the temperature of the temperature sensitive member decreases. That is, when the temperature of the fuel cell is relatively low, the humidification amount of the cathode gas decreases. When the temperature of the fuel cell is relatively high, the humidification amount of the cathode gas increases. In this way, the humidification amount of the cathode gas supplied to the fuel cell can be suitably adjusted with a simple structure without providing a bypass path or a bypass valve outside the humidifier.

The moisture permeable member may be a moisture permeable membrane, and the temperature sensitive member may be attached to at least one of an inside and an outside of a curved portion of the moisture permeable membrane.

The moisture permeable members may be hollow fiber membranes, and the temperature sensitive member may be curved so as to grasp the hollow fiber membranes.

An element configured to perform at least one of heating and cooling the temperature sensitive member may be included.

The temperature sensitive member may be a porous body partially exposing the moisture permeable member.

The temperature sensitive member may include at least one of a bimetal and a shape memory alloy.

The above object is also achieved by a fuel cell system including: a fuel cell; and a humidifier, wherein the humidifier includes: moisture permeable members each having a tubular shape; a case housing the moisture permeable members; a first flow path portion in which one of cathode gas to be supplied to a fuel cell and cathode off-gas discharged from the fuel cell flows inside the moisture permeable members; a second flow path portion in which the other of the cathode gas and the cathode off-gas flows outside the moisture permeable members within the case; and a temperature sensitive member attached to at least one of the moisture permeable members, deformable in response to temperature, and deforming so as to decrease a gap between the moisture permeable members as the temperature decreases.

DETAILED DESCRIPTION

Figure 1:
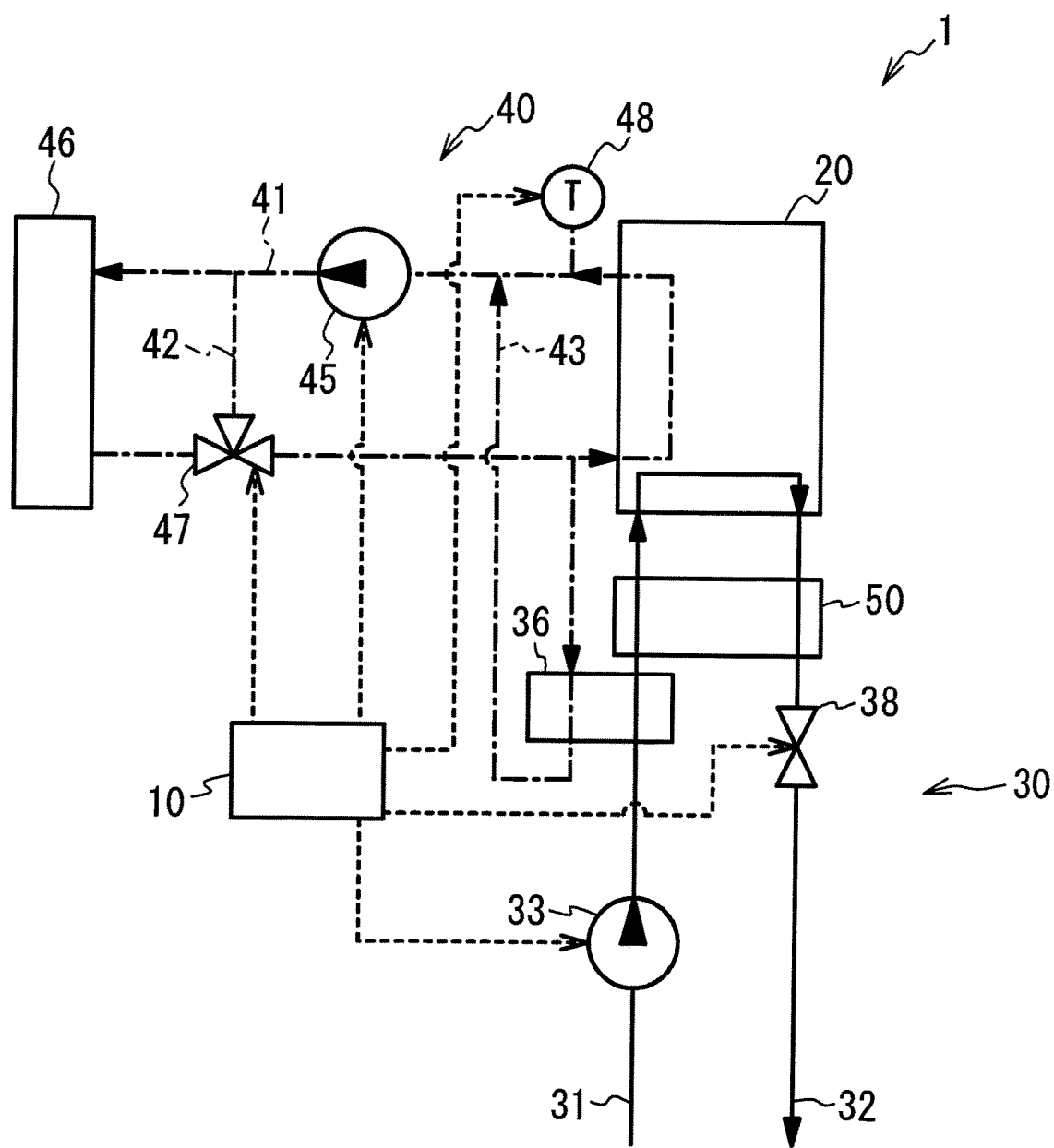
FIG. 1 is a schematic view of a fuel cell system.

FIG. 1 is a schematic view of a fuel cell system 1 (hereinafter, referred to as a system). The system 1 includes a control device 10, a fuel cell 20, an air supply system 30, a cooling system 40, and the like. The system 1 supplies electric power generated by the fuel cell 20 to a motor (not illustrated) and the like. The control device 10 is a computer including a Central Processing Unit (CPU), a Read Only Memory (ROM), a Random Access Memory (RAM) and the like, is electrically connected to devices described later and controls the entire system 1. Additionally, the system 1 includes a hydrogen gas supply system (not illustrated) for supplying a hydrogen gas as anode gas to the fuel cell 20, and a power control system for controlling electric power generated by the fuel cell 20.

The air supply system 30 includes a supply path 31, a discharge path 32, a compressor 33, an intercooler 36, and a back pressure valve 38. The air supply system 30 supplies air to the fuel cell 20 and is configured as follows. The air containing oxygen taken from the atmosphere (cathode gas) is compressed by the compressor 33 via the supply path 31, is cooled by the intercooler 36, and is supplied to the fuel cell 20. The discharge path 32 discharges the cathode off-gas discharged from the fuel cell 20 to the atmosphere. The back pressure valve 38 adjusts the back pressure on the cathode side of the fuel cell 20. A humidifier 50 humidifies the cathode gas passing through the supply path 31 by use of moisture contained in the cathode off-gas passing through the discharge path 32. The compressor 33, the intercooler 36, and the humidifier 50 are arranged on the supply path 31 in this order from the upstream side. The humidifier 50 and the back pressure valve 38 are arranged on the discharge path 32 in this order from the upstream side.

The cooling system 40 includes a circulation path 41, a bypass path 42, a distribution path 43, a circulation pump 45, a radiator 46, a three-way valve 47, and a temperature sensor 48. The cooling system 40 circulates cooling water as coolant through predetermined paths so as to cool the fuel cell 20, and is configured as follows. The coolant is circulated through the circulation path 41 by the circulation pump 45, is heat-exchanged and cooled by the radiator 46, and is supplied to the fuel cell 20. The bypass path 42 branches off from the circulation path 41 and bypasses the radiator 46. The three-way valve 47 adjusts the flow rate of the coolant flowing through the bypass path 42. The distribution path 43 is branched off from the circulation path 41 and is connected to the intercooler 36, and is connected to the circulation path 41 again. The air passing through the intercooler 36 is cooled by the coolant. The temperature sensor 48 detects the temperature of the coolant discharged from the fuel cell 20. Further, the distribution path 43 branches off from the circulation path 41 on the upstream side of the fuel cell 20 and on the downstream side of the three-way valve 47, and joins the circulation path 41 on the downstream side of the fuel cell 20 and on the upstream side of the circulation pump 45.

Figure 2A:
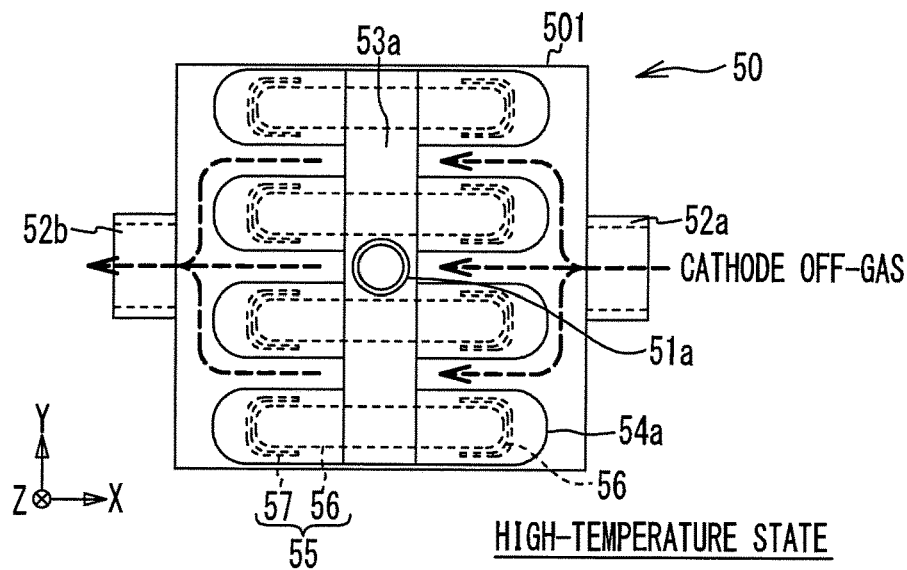
FIGS. 2A to 2C are explanatory views of a humidifier.
Figure 2B:
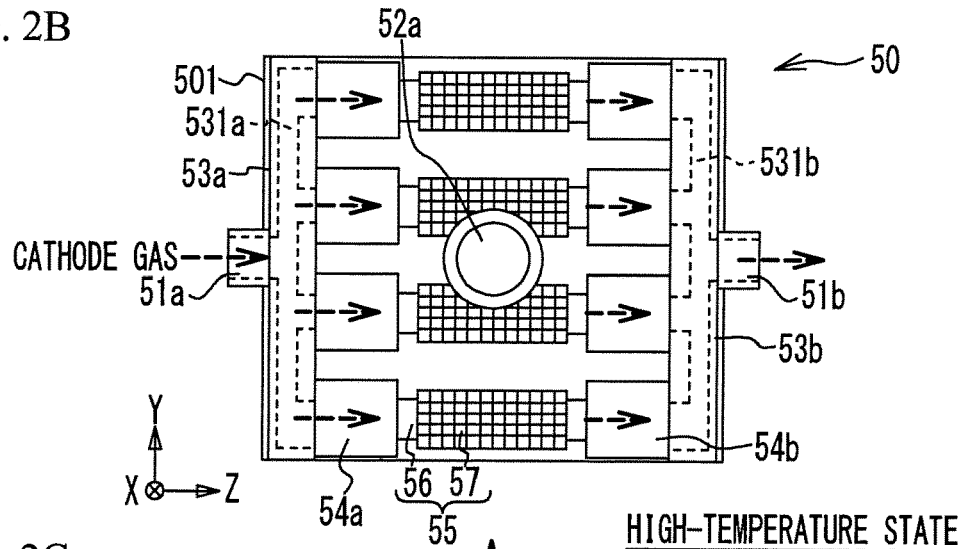
Figure 2C:
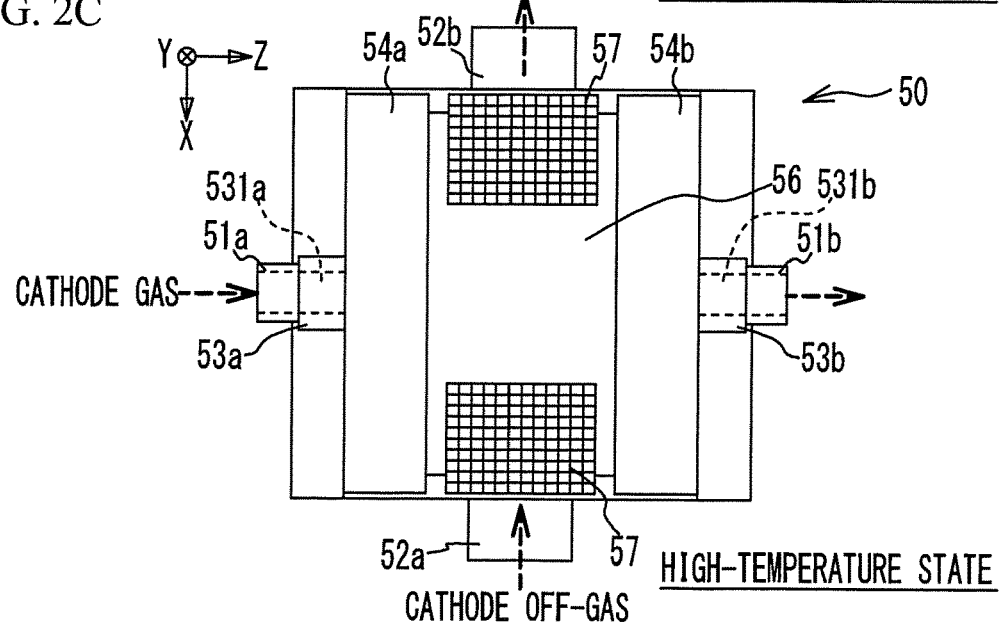

Next, the humidifier 50 will be described. FIGS. 2A to 2C are explanatory views of the humidifier 50. The humidifier 50 illustrated in FIGS. 2A to 2C differs in shape from the humidifier 50 schematically illustrated in FIG. 1, but the humidifier 50 is not limited to the shape illustrated in FIGS. 2A to 2C. The humidifier 50 includes a case 501, a gas inlet 51a, a gas outlet 51b, an off-gas inlet 52a, an off-gas outlet 52b, a distribution pipe 53a, a junction pipe 53b, seal members 54a, seal members 54b, and moisture permeable units 55.

The case 501 has a substantially rectangular parallelepiped shape, and houses the distribution pipe 53a, the junction pipe 53b, the seal members 54a and 54b, and the moisture permeable units 55. The gas inlet 51a and the gas outlet 51b are provided so as to respectively protrude outwardly from two surfaces of the case 501 that are opposite to each other in the Z direction. The off-gas inlet 52a and the off-gas outlet 52b are provided so as to respectively protrude outwardly from two surfaces of the case 501 that are opposite to each other in the X direction. A pipe is connected to each of the gas inlet 51a and the gas outlet 51b, and defines a part of the above-described supply path 31. Likewise, a pipe is connected to each of the off-gas inlet 52a and the off-gas outlet 52b, and defines a part of the discharge path 32. The case 501, the gas inlet 51a, the gas outlet 51b, the off-gas inlet 52a, and the off-gas outlet 52b are made of, for example, metal, but not limited thereto.

The distribution pipe 53a and the junction pipe 53b extend in the Y direction as the longitudinal direction and are respectively connected to the gas inlet 51a and the gas outlet 51b. The distribution pipe 53a and the junction pipe 53b are respectively arranged within the case 501 at one end and the other end thereof in the Z direction, and are arranged substantially at the center in the X direction. The gas inlet 51a and the gas outlet 51b are respectively joined to the outer surfaces of the distribution pipe 53a and the junction pipe 53b. The gas inlet 51a and the gas outlet 51b respectively protrude from openings formed on two surfaces of the case 501 that are opposite to each other in the Z direction. A distribution path 531a and a junction path 531b are respectively formed in the distribution pipe 53a and the junction pipe 53b. The distribution path 531a and the junction path 531b respectively communicate with the gas inlet 51a and the gas outlet 51b. The distributing pipe 53a and the junction pipe 53b are made of, for example, metal, but not limited thereto.

An inner surface of the distribution pipe 53a is connected to seal members 54a arranged side by side in the Y direction. Each seal member 54a has a flat tubular shape with a bottom, and the longitudinal direction of each seal member 54a is the X direction. The bottom portion of the seal member 54a having a flat tubular shape is provided with an opening that communicates with the distribution path 531a of the distribution pipe 53a. Thus, the distribution path 531a communicates with the space inside the seal member 54a. Likewise, an inner surface of the junction pipe 53b is connected to the seal members 54b arranged side by side in the Y direction. Each seal member 54b has a flat tubular shape with a bottom, and the longitudinal direction of each seal member 54b is the X direction. The bottom portion of the seal member 54b having a flat tubular shape is provided with an opening that communicates with the junction path 531b of the junction pipe 53b. Thus, the junction path 531b communicates with the space inside the seal member 54b. The seal members 54a and 54b are made of, for example, rubber.

The moisture permeable unit 55 includes a moisture permeable membrane 56 and a temperature sensitive member 57. As for the moisture permeable membrane 56, a moisture permeable membrane having a flat membrane shape is formed into a flat tubular shape like the seal members 54a and 54b. Peripheral edges of one end and the other end of the moisture permeable membrane 56 are respectively connected to the inner peripheries of the seal members 54a and 54b, which holds the moisture permeable membrane 56. Therefore, the moisture permeable membranes 56 are arranged side by side in the Y direction. A length of the moisture permeable membrane 56 in the Z direction of the axial direction thereof is greater than each length of the seal members 54a and 54b. The moisture permeable membrane 56 is an example of a moisture permeable member having a tubular shape.

The cathode gas flows from the gas inlet 51a to the distribution path 531a of the distribution pipe 53a, the inside of the seal member 54a, the inside of the moisture permeable membrane 56, the inside of the seal member 54b, the junction path 531b of the junction pipe 53b, and the gas outlet 51b, in this order. The gas inlet 51a, the distribution pipe 53a, the seal members 54a and 54b, the junction pipe 53b, and the gas outlet 51b are an example of a first flow path portion in which one of the cathode gas to be supplied to the fuel cell 20 and the cathode off-gas discharged from the fuel cell 20 flows inside the moisture permeable membrane 56.

The temperature sensitive members 57 are attached to the moisture permeable membrane 56. Specifically, the temperature sensitive members 57 are respectively attached to portions of the moisture permeable membrane 56 exposed from the seal members 54a and 54b. Those portions are one curved portion and the other curved portion, arranged in the X direction, of the moisture permeable membrane 56. The temperature sensitive members 57 are respectively attached to outer surfaces of one curved portion and the other curved portion, and extend in the Z direction. Therefore, the temperature sensitive members 57 itself are also curved. The moisture permeable membrane 56 and the temperature sensitive members 57 will be described later in detail.

The off-gas inlet 52a and the off-gas outlet 52b communicate with the space inside the case 501 and outside the seal members 54a and 54b and the moisture permeable units 55. Thus, the cathode off-gas is introduced into the case 501 from the off-gas inlet 52a, flows outside the seal members 54a and 54b and the moisture permeable membrane 56, and is discharged from the off-gas outlet 52b. Further, the cathode off-gas flows through a gap between the seal members 54a, a gap between the seal members 54b, and a gap between the moisture permeable membranes 56, within the case 501. The off-gas inlet 52a and the off-gas outlet 52b are examples of a second flow path portion in which the other of the cathode gas and the cathode off-gas flows inside the case 501 and outside the moisture permeable membrane 56.

In the moisture permeable membrane 56, as depending on the difference in water vapor partial pressure between the gases flowing thereinside and thereoutside, water molecules move in the membrane. In the present embodiment, the cathode gas compressed by the compressor 33 and cooled by the intercooler 36 flows inside the moisture permeable membranes 56, and the cathode off-gas flows outside the moisture permeable membranes 56. Herein, the water vapor partial pressure of the cathode off-gas is higher than that of the cathode gas, due to water generated by the power generation reaction of the fuel cell 20. Therefore, moisture contained in the cathode off-gas moves to the cathode gas through the moisture permeable membranes 56, which humidifies the cathode gas.

Figure 3A:
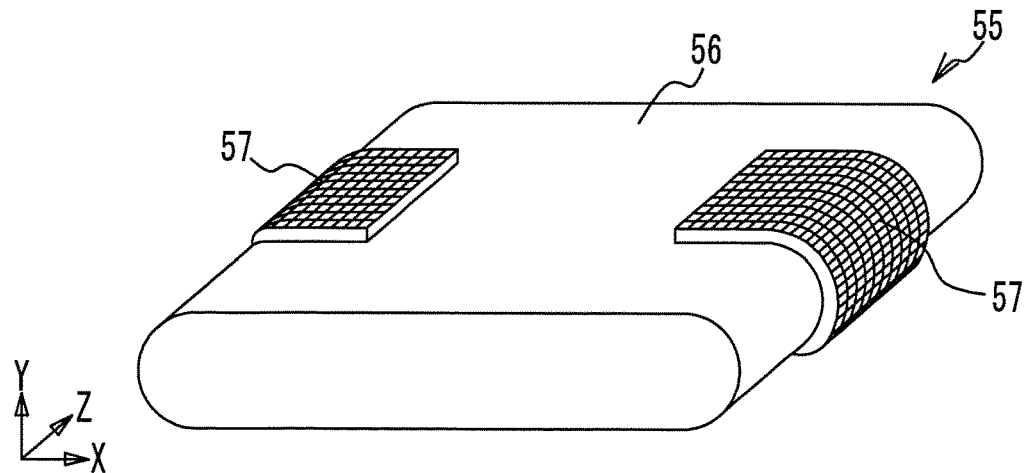
FIGS. 3A to 3C are external views of a moisture permeable unit.
Figure 3B:
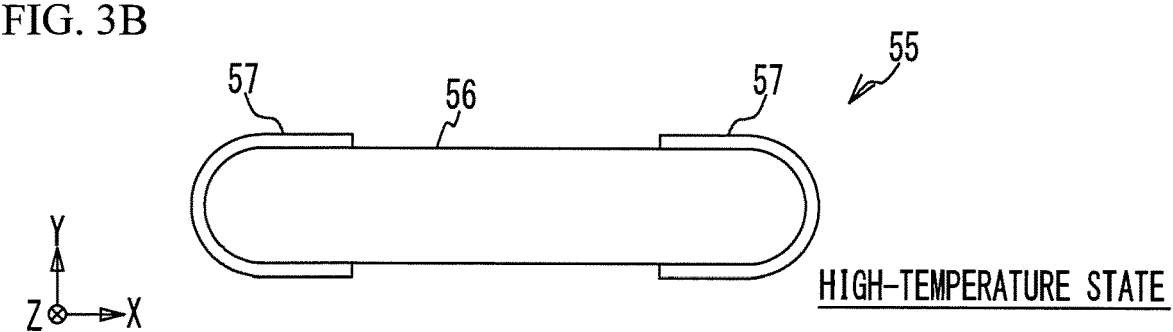
Figure 3C:
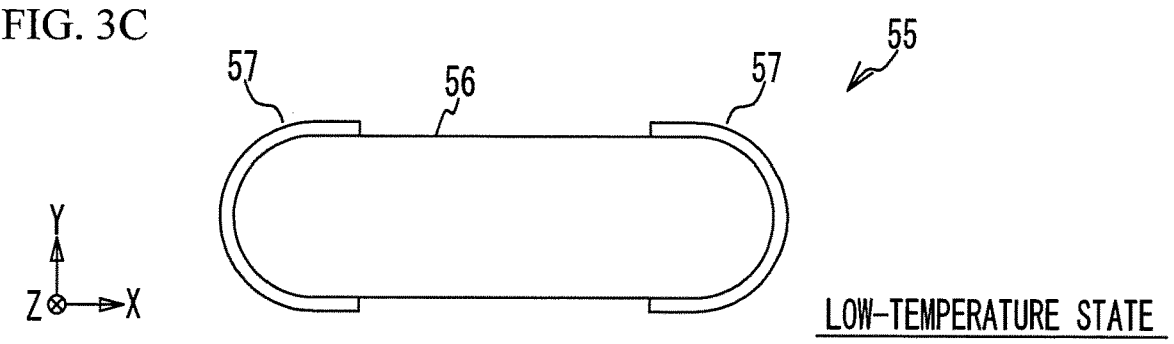

Next, the temperature sensitive member 57 will be described in detail. FIGS. 3A to 3C are external views of the moisture permeable unit 55. The temperature sensitive member 57 is deformable in response to the temperature. Specifically, a curvature of the curved shape of the temperature sensitive member 57 decreases, as the temperature thereof decreases. That is, the curvature of the curved shape of the temperature sensitive member 57 is relatively large in a relatively high-temperature state. The curvature of the curved shape of the temperature sensitive member 57 is relatively small in a relatively low-temperature state. FIGS. 3A and 3B illustrate the moisture permeable unit 55 in the high-temperature state of the temperature sensitive member 57. FIG. 3C illustrates the moisture permeable unit 55 in the low-temperature state of the temperature sensitive member 57. As illustrated in FIGS. 3A and 3B, the moisture permeable membrane 56 is deformed to be long in the X direction and small in the Y direction in the high-temperature state of the temperature sensitive member 57. In contrast, the moisture permeable membrane 56 is deformed to be short in the X direction and large in the Y direction in the low-temperature state of the temperature sensitive member 57. That is, the moisture permeable membrane 56 is deformed to be further flat in the high-temperature state of the temperature sensitive member 57, as compared with the low-temperature state. FIGS. 2A to 2C illustrate the humidifier 50 in the high-temperature state of the temperature sensitive members 57.

Figure 3D:
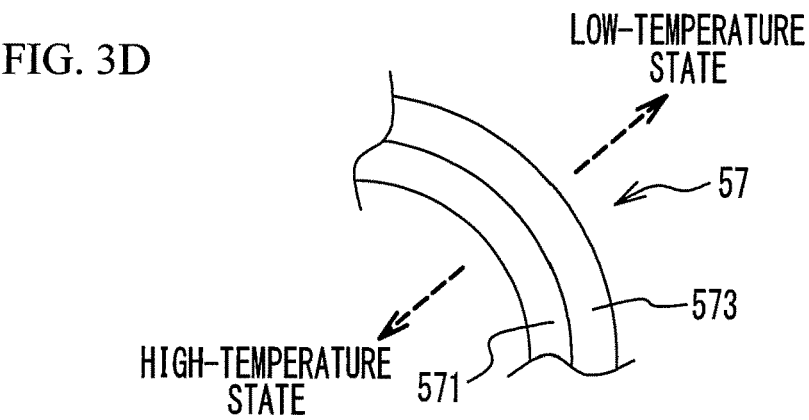
FIG. 3D is a partially enlarged view of a temperature sensitive member.

FIG. 3D is a partially enlarged view of the temperature sensitive member 57. The temperature sensitive member 57 is a bimetal formed by bonding two metal plates 571 and 573 having different linear expansion coefficients. The metal plate 571 is attached to the outer surface of the curved portion of the moisture permeable membrane 56. The metal plate 573 is attached to the metal plate 571. That is, the temperature sensitive member 57 is curved so as to protrude outside the moisture permeable membrane 56, and the metal plate 573 is closer to the outside than the metal plate 571. Here, the metal plate 571 is made of a material having a linear expansion coefficient smaller than that of the metal plate 573. Therefore, both the metal plates 571 and 573 are expanded in the high-temperature state, but the difference in expansion amount between the metal plates 571 and 573 increases, and the curvature of the temperature sensitive member 57 increases. Both the metal plates 571 and 573 are shrunk in the low-temperature state as compared with the high-temperature state, but the difference in expansion amount between the metal plates 571 and 573 decreases, and the curvature of the temperature sensitive member 57 decreases. In such a manner, the curvature of the temperature sensitive member 57 decreases as the temperature decreases, and then the temperature sensitive member 57 is deformed as described above.

Figure 4A:
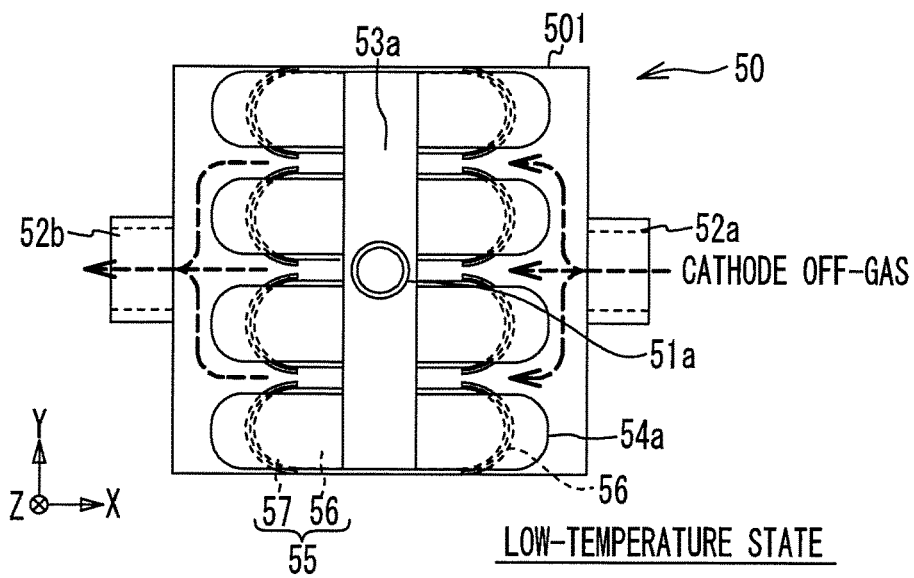
FIGS. 4A to 4C are explanatory views of the humidifier in a low-temperature state of the temperature sensitive members.
Figure 4B:
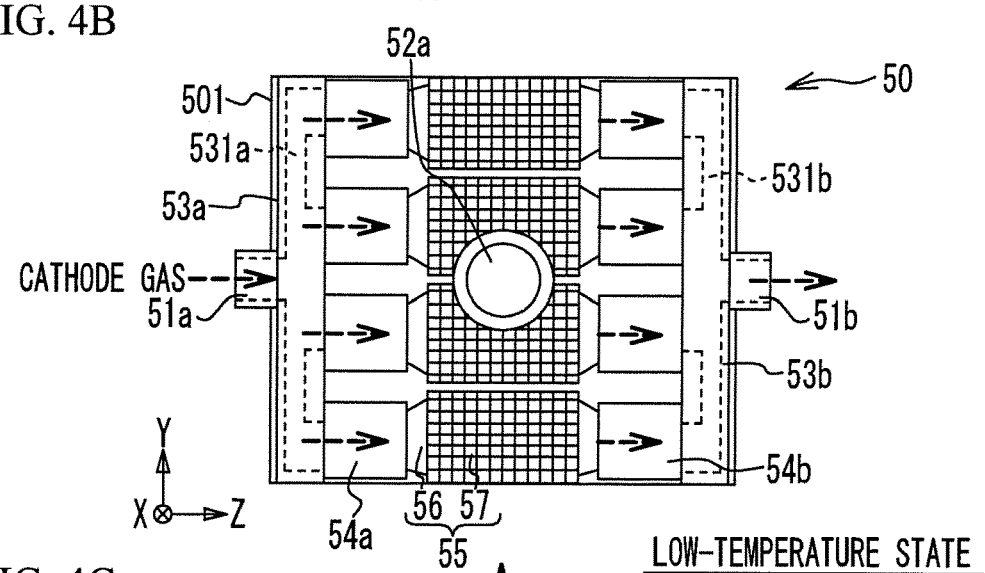
Figure 4C:
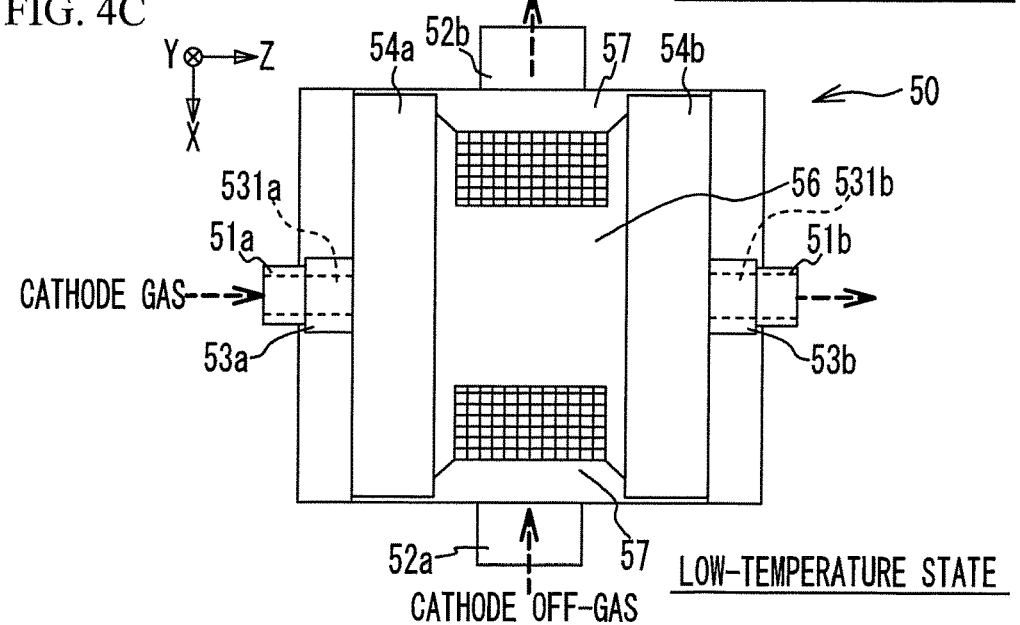

FIGS. 4A to 4C are explanatory views of the humidifier 50 in the low-temperature state of the temperature sensitive member 57. As described above, the curvature of the temperature sensitive member 57 decreases as the temperature thereof decreases, and one end and the other end of the moisture permeable membrane 56 are respectively connected to the seal members 54a and 54b. Therefore, the moisture permeable membrane 56 is partially deformed between the seal members 54a and 54b. Since the moisture permeable units 55 are arranged side by side in the Y direction, the moisture permeable membranes 56 are deformed such that the gap between the moisture permeable membranes 56 in the Y direction decreases as the temperature of the temperature sensitive member 57 decreases. A decrease in the gap between the moisture permeable membranes 56 increases a pressure loss of the cathode off-gas flowing through the gap therebetween, which decreases the flow rate of the cathode off-gas flowing through this gap. That is, the flow rate of the cathode off-gas flowing through the gap between the moisture permeable membranes 56 decreases as the temperature of the temperature sensitive member 57 decreases. Thus, the amount of moisture moving from the cathode off-gas to the cathode gas via the moisture permeable membrane 56 decreases as the temperature of the temperature sensitive member 57 decreases, which decreases a humidification amount of the cathode gas in the humidifier 50. That is, the humidification amount of the cathode gas increases in the high-temperature state, whereas the humidification amount of the cathode gas decreases in the low-temperature state.

Since the temperature sensitive member 57 is exposed to the cathode off-gas, the temperature sensitive member 57 is influenced by the temperature of the cathode off-gas. The temperature sensitive member 57 is not directly exposed to the cathode gas, but the temperature sensitive member 57 is influenced by the temperature of the cathode gas through the moisture permeable membrane 56. Herein, for example, an increase in the output of the fuel cell 20 increases the temperature of the fuel cell 20 due to an increase in power generation amount of the fuel cell 20. This increases the temperature of the cathode off-gas. When the required output of the fuel cell 20 increases, the control device 10 controls the rotational speed of the compressor 33 to increase, in order to increase the supply amount of the cathode gas to the fuel cell 20. This increases the temperature of the cathode gas compressed by the compressor 33. In such a manner, the increase in the output of the fuel cell 20 increases the temperatures of the cathode off-gas, the cathode gas, and the fuel cell 20. Accordingly, the increase in the output of the fuel cell 20 also increases the temperature of the temperature sensitive member 57, which increases the humidification amount of the cathode gas.

In addition, a decrease in the output of the fuel cell 20 decreases the temperature of the fuel cell 20 due to the power generation reaction in the fuel cell 20, which decreases the temperature of the cathode off-gas. When the required output of the fuel cell 20 decreases, the control device 10 controls the rotation speed of the compressor 33 to decrease, in order to decrease the supply amount of the cathode gas to the fuel cell 20. This decreases the temperature of the cathode gas compressed by the compressor 33. In such a manner, the decrease in the output of the fuel cell 20 decreases the temperatures of the cathode off-gas, the cathode gas, and the fuel cell 20. Accordingly, the decrease in the output of the fuel cell 20 decreases the temperature of the temperature sensitive member 57, which decreases the humidification amount of the cathode gas.

For example, cathode gas with high humidity is supplied to the fuel cell 20 at the time of low temperature of the fuel cell 20, which might generate condensed water in the fuel cell 20, and then flooding might occur. Further, cathode gas with low humidity is supplied to the fuel cell 20 at the time of high temperature of the fuel cell 20, which might dry the electrolyte membrane of the fuel cell 20. With the humidifier 50 according to the present embodiment, when the temperature of the fuel cell 20 is high, the humidification amount of the cathode gas increases, and then the cathode gas with high humidity is supplied to the fuel cell 20 accordingly. When the temperature of the fuel cell 20 is low, the humidification amount of the cathode gas decreases, and the cathode gas with low humidity is supplied to the fuel cell 20. In such a manner, the humidifier 50 can suitably adjust the humidification amount of the cathode gas, thereby suppressing the occurrence of the above problems. This also eliminates the need for a bypass path causing the cathode off-gas to bypass from the humidifier 50 and the need for a bypass valve adjusting the bypass amount of the cathode off-gas. With a simple structure, it is therefore possible to suitably adjust the humidification amount of the cathode gas.

In the above embodiment, the state in which the moisture permeable membranes 56 are not in contact with each other is illustrated as the low-temperature state, but the moisture permeable membranes 56 may be deformed to be in contact with each other. In this state, the cathode off-gas does not substantially flow through the gap between the moisture permeable membranes 56, thereby further decreasing the humidification amount.

In the above embodiment, the four moisture permeable units 55 are provided, but the present invention is not limited thereto. At least two moisture permeable units 55 may be provided. At least one moisture permeable unit 55 with the temperature sensitive member 57 may be provided. For example, only two moisture permeable membranes 56 are provided, and the temperature sensitive member 57 may be attached to only one of the moisture permeable membranes 56. This is because the gap between the moisture permeable membranes 56 in this case also changes in response to the temperature of the temperature sensitive member 57, and the humidification amount of the cathode gas can be adjusted. Additionally, although two temperature sensitive members 57 are attached to the moisture permeable membrane 56, at least one temperature sensitive member 57 may be provided therewith.

Figure 5A:
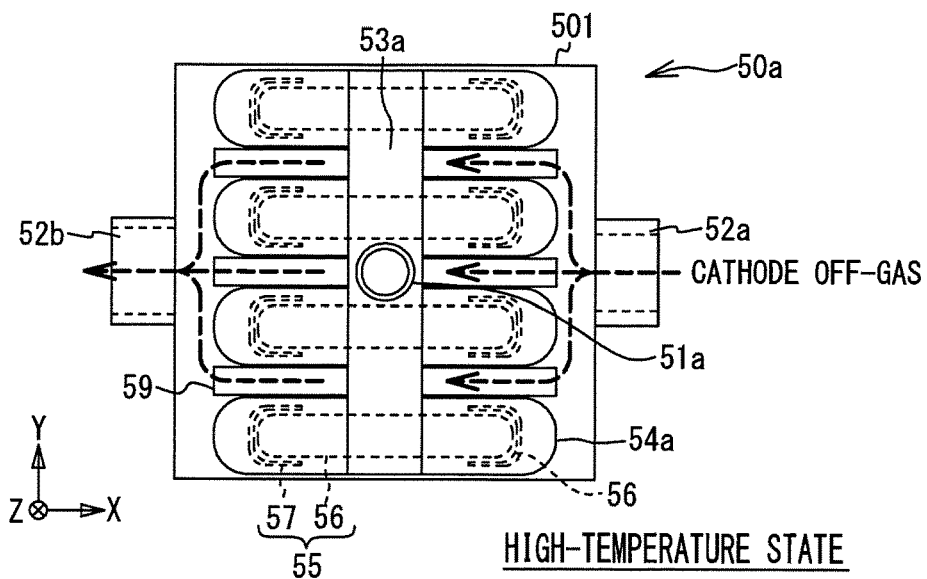
FIGS. 5A to 5C are explanatory views of a humidifier according to a variation.
Figure 5B:
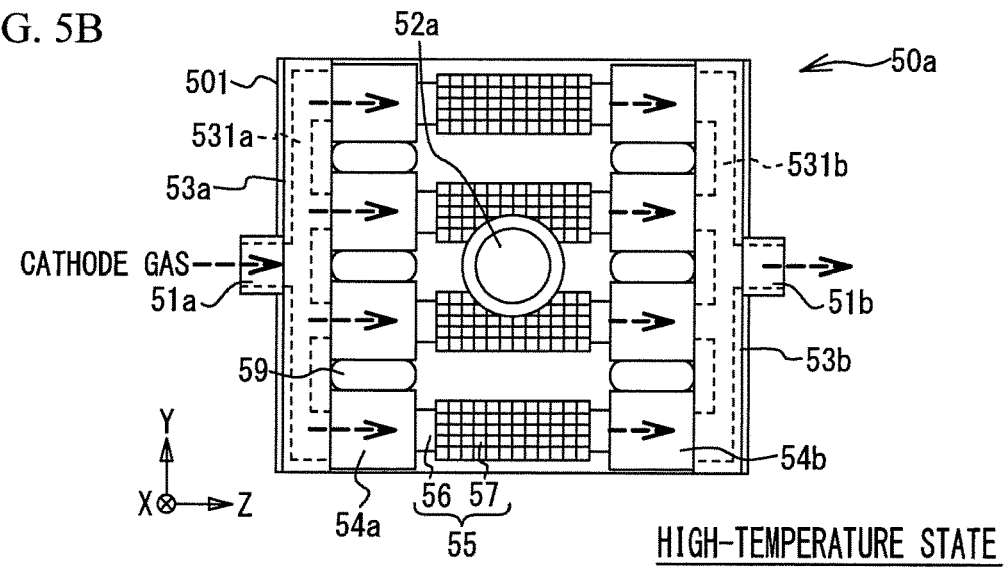
Figure 5C:
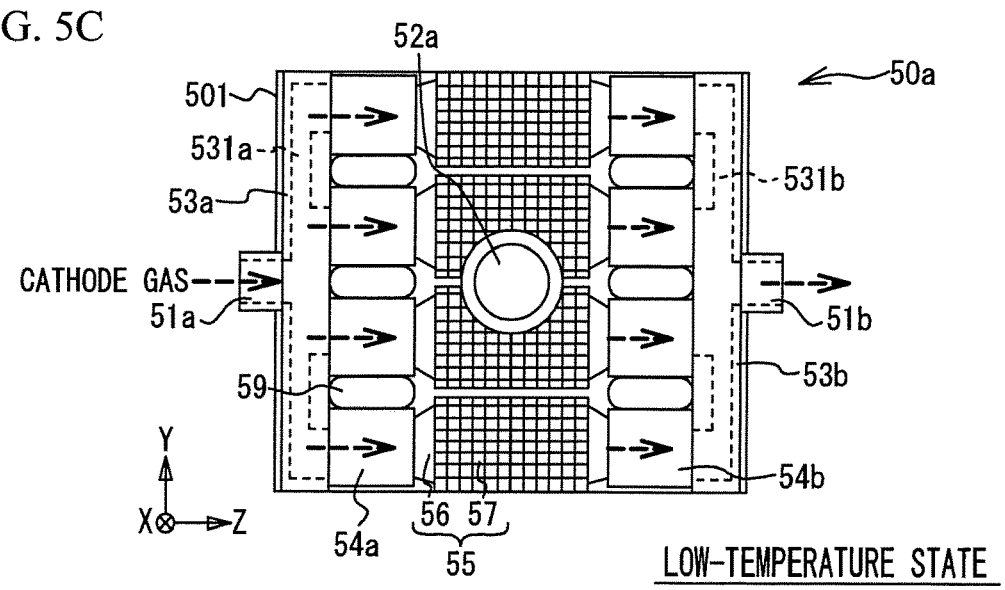

Next, variations will be described. In the description of the following variations, the same components are denoted by the same reference numerals, and the duplicated description is omitted. FIGS. 5A to 5C are explanatory views of a humidifier 50a according to a variation. FIGS. 5A and 5B illustrate the humidifier 50a in the high-temperature state of the temperature sensitive members 57, and FIG. 5C illustrates the humidifier 50a in the low-temperature state of the temperature sensitive members 57. Partition pipes 59 extending in the X direction are disposed between the seal members 54a and between the seal members 54b. In other words, the partition pipe 59 is arranged at such a position as not to interfere with the moisture permeable unit 55 deformed in the low-temperature state. The partition pipe 59 extends longer than the moisture permeable unit 55 in the X direction. A part of the cathode off-gas introduced into the case 501 from the off-gas inlet 52a is discharged from the off-gas outlet 52b through the partition pipe 59. Herein, the cathode off-gas once flowing through the partition pipe 59 is discharged from the case 501 without passing through the gap between the moisture permeable membranes 56. For example, in the low-temperature state, it is therefore possible to further decrease the flow rate of the cathode off-gas flowing through the gap between the moisture permeable membranes 56. This can further decrease the humidification amount of the cathode gas in the low-temperature state.

Additionally, one partition pipe 59 may be arranged either between the seal members 54a or between the seal members 54b. The partition pipe 59 has, but not limited to, a flat circular shape when viewed in the X direction which is the axial direction thereof. The partition pipe 59 may have a substantially elliptical shape, a substantially perfect circle shape or a substantially rectangular shape. Further, the present invention is not limited to a tubular member such as the partition pipe 59. For example, a partition plate may partition one of the space between the seal members 54a and the space between the seal members 54b, and the space between the moisture permeable units 55.

Figure 6A:
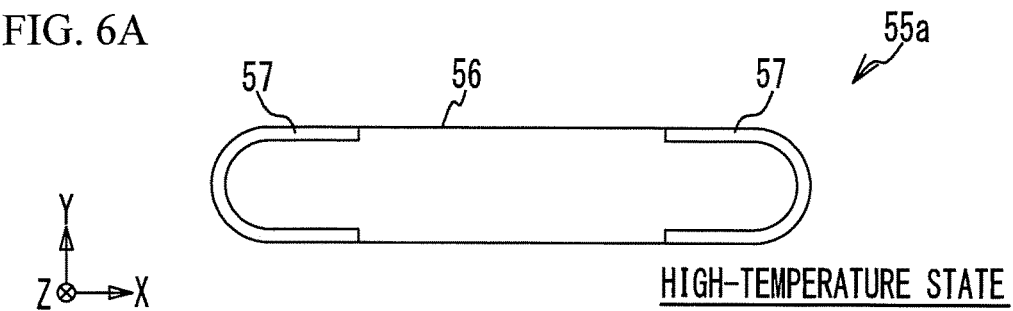
FIGS. 6A to 6D are explanatory views of moisture permeable units according to variations.
Figure 6B:
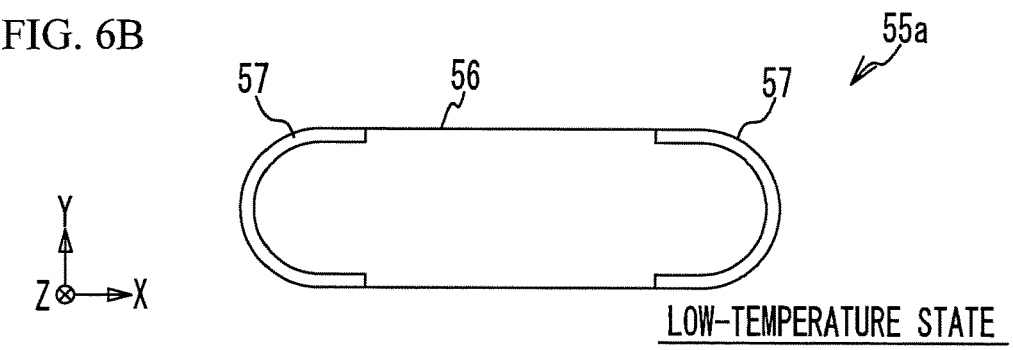

FIGS. 6A and 6B are explanatory views of a moisture permeable unit 55a according to a variation. In the moisture permeable unit 55a, the temperature sensitive member 57 is attached to an inner surface of the curved portion of the moisture permeable membrane 56. That is, the metal plate 573 having a linear expansion coefficient larger than that of the metal plate 571 is attached to the inner surface of the curved portion of the moisture permeable membrane 56. The metal plate 571 is closer to the inside than the metal plate 573. Even in this case, the temperature sensitive member 57 is influenced by the temperatures of the cathode off-gas and the cathode gas, and the curvature of the temperature sensitive member 57 decreases as the temperature thereof decreases. This suitably adjusts the humidification amount of the cathode gas. Also, in this variation, only one temperature sensitive member 57 may be provided for the moisture permeable membrane 56. Further, the temperature sensitive members 57 may be attached to both inner and outer surfaces of the curved portion of the moisture permeable membrane 56.

Figure 6C:
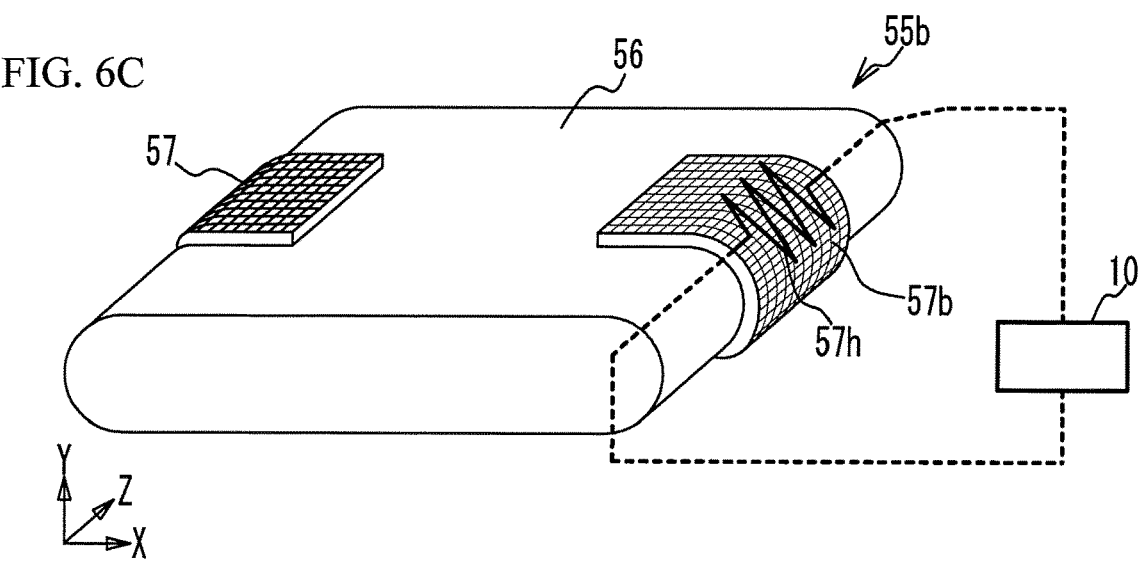

FIG. 6C is an explanatory view of a moisture permeable unit 55b according to a variation. A heating element 57h is fixed to a temperature sensitive member 57b. The heating element 57h is electrically connected to the control device 10. The control device 10 controls an energization state of the heating element 57h. The energization of the heating element 57h generates heat, which heats the temperature sensitive member 57b. The heating element 57h is, for example, a Peltier element.

The control device 10 controls the energization state of the heating element 57h in accordance with the required output of the fuel cell 20. For example, when the required output of the fuel cell 20 is equal to or greater than a predetermined value, the control device 10 starts energizing the heating element 57h so as to heat the temperature sensitive member 57b, which increases the curvature of the temperature sensitive member 57b. This can increase the humidification amount of the cathode gas in accordance with the increase in the required output of the fuel cell 20. In addition, when an increasing rate per unit time of the required output of the fuel cell 20 is equal to or greater than a predetermined value, the control device 10 may start energizing the heating element 57h to heat the temperature sensitive member 57b. In this case, it is possible to increase the humidification amount of the cathode gas with high responsiveness to the increase in the required output of the fuel cell 20. Further, the control device 10 may control the energization state of the heating element 57h according to the temperature of the fuel cell 20. For example, when the temperature of the fuel cell 20 is equal to or higher than a predetermined value, the control device 10 may start energizing the heating element 57h to heat the temperature sensitive member 57b. In this case, it is possible to increase the humidification amount of the cathode gas with high responsiveness to the increase in the temperature of the fuel cell 20.

In this variation, although the heating element 57h is provided only in the temperature sensitive member 57b of the temperature sensitive members 57 and 57b provided for one moisture permeable membrane 56, the heating element 57h may be provided in the other temperature sensitive member 57. Further, the temperature sensitive member 57b may be provided in not outside but inside the moisture permeable membrane 56.

Instead of the heating element 57h, a cooling element for cooling the temperature sensitive member 57b by energization may be used. Also in this case, the control device 10 controls the energization state of the cooling element according to the required output of the fuel cell 20. For example, when the required output of the fuel cell 20 is smaller than a predetermined value, the control device 10 may start energizing the cooling element to cool the temperature sensitive member 57b, which decreases the curvature of the temperature sensitive member 57b. It is therefore possible to decrease the humidification amount of the cathode gas in accordance with the decrease in the required output of the fuel cell 20. Additionally, when a decrease rate per unit time of the required output of the fuel cell 20 is equal to or greater than a predetermined value, the control device 10 may start energizing the cooling element to cool the temperature sensitive member 57b. In this case, it is possible to decrease the humidification amount of the cathode gas with high responsiveness to the decrease in the required output of the fuel cell 20. Further, the control device 10 may control the energization state of the cooling element according to the temperature of the fuel cell 20. For example, when the temperature of the fuel cell 20 is smaller than a predetermined value, the control device 10 may start energizing the cooling element to cool the temperature sensitive member 57b. In this case, it is possible to decrease the humidification amount of the cathode gas with high responsiveness to the decrease in the temperature of the fuel cell 20. Additionally, the temperature of the fuel cell 20 may be estimated based on a detection value of the temperature sensor 48 detecting the coolant temperature, obtained from a sensor directly detecting the temperature of the fuel cell 20, or obtained in another way.

The heating element 57h and the cooling element described above may be provided in one temperature sensitive member 57b, and the state may changes among the energization of only one of the heating element 57h and the cooling element, the energization of the other one, the nonenergization of both, in accordance with the required output of the fuel cell 20 and the temperature thereof. Further, the heating element 57h or the cooling element may not always need to be in direct contact with the temperature sensitive member 57b, but may be provided within the case 501 at, for example, a position spaced away to some extent to heat or cool the temperature sensitive member 57b.

The cooling element can be a Peltier element used as the heating element 57h described above. Specifically, the Peltier element can be used as the cooling element by reversing the direction of current flowing through the Peltier element used as the heating element 57h. Therefore, the single Peltier element may be used as the heating element or the cooling element by changing the energizing direction of the single Peltier element, as depending on the situation.

Figure 6D:
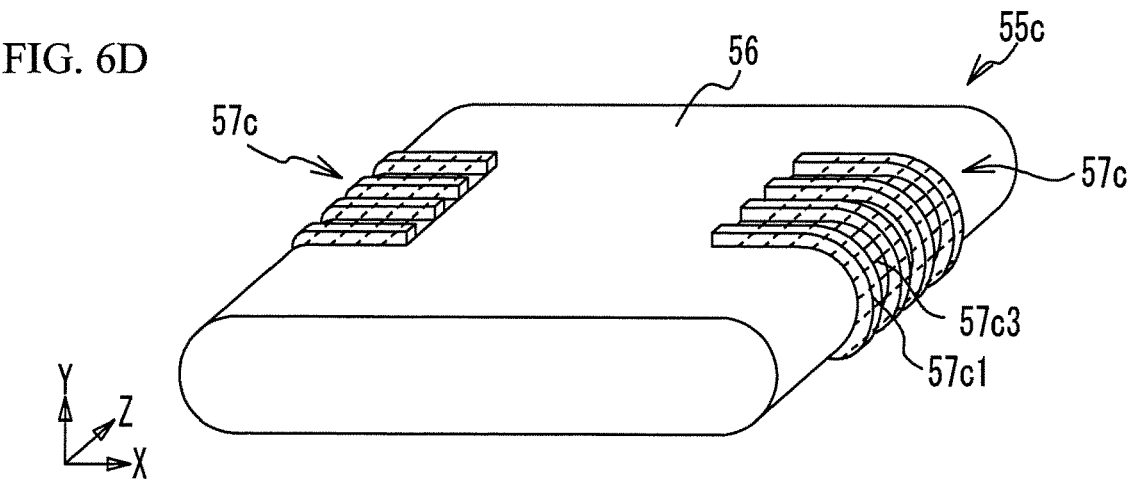

FIG. 6D is an explanatory view of a moisture permeable unit 55c according to a variation. A temperature sensitive member 57c includes curved portions 57c1 and connecting portions 57c3. The connecting portion 57c3 is made of, for example, synthetic resin, and has a thin bar shape extending in the Z direction parallel to the axial direction of the moisture permeable membrane 56 along the curved portion thereof. The connecting portions 57c3 are arranged substantially in parallel to one another. The curved portion 57c1 has a curved filamentous shape, and is fixed to the connecting portions 57c3 substantially perpendicular thereto. The curved portions 57c1 are arranged substantially in parallel to one another and at intervals in the Z direction. The curved portions 57c1 are connected to each other via the connecting portion 57c3. The curved portion 57c1 is also made of, for example, two metals having different linear expansion coefficients, deformable in responses to the temperature, and the curvature decreases as the temperature decreases. Further, the moisture permeable membrane 56 is partially exposed from the gaps among the curved portions 57c1 and the connecting portions 57c3. That is, the temperature sensitive member 57c is an example of a porous body partially exposing the moisture permeable membrane 56. Therefore, the area of the temperature sensitive member 57c covering the moisture permeable membrane 56 is small, as compared with the above-described temperature sensitive member 57. This ensures the area where the cathode off-gas contacts with the moisture permeable membrane 56. It is thus possible to ensure the amount of moisture moving from the cathode off-gas to the cathode gas, and to humidify the cathode gas efficiently.

The temperature sensitive member 57c may be provided not outside but inside the moisture permeable membrane 56. Only one temperature sensitive member 57c may be provided for one moisture permeable membrane 56. At least one of the heating element and the cooling element described above may be provided in the temperature sensitive member 57c. Further, like the temperature sensitive member 57c described above, the connecting portion 57c3 is not limited to be made of synthetic resin, and may be made of, for example, metal. In this case, it may be made of one type of metal so as not to change the curvature of the moisture permeable membrane 56 about the axis thereof due to a change in ambient temperature. In the case where the connecting portion 57c3 is made of metal, the connecting portion 57c3 may be made of the same material as one of the metal plates of the curved portion 57c1. For example, in order to make the temperature sensitive member 57c, a mesh-shaped metal member may be combined with a curved portion of metal materials having different linear expansion coefficients.

Figure 7A:
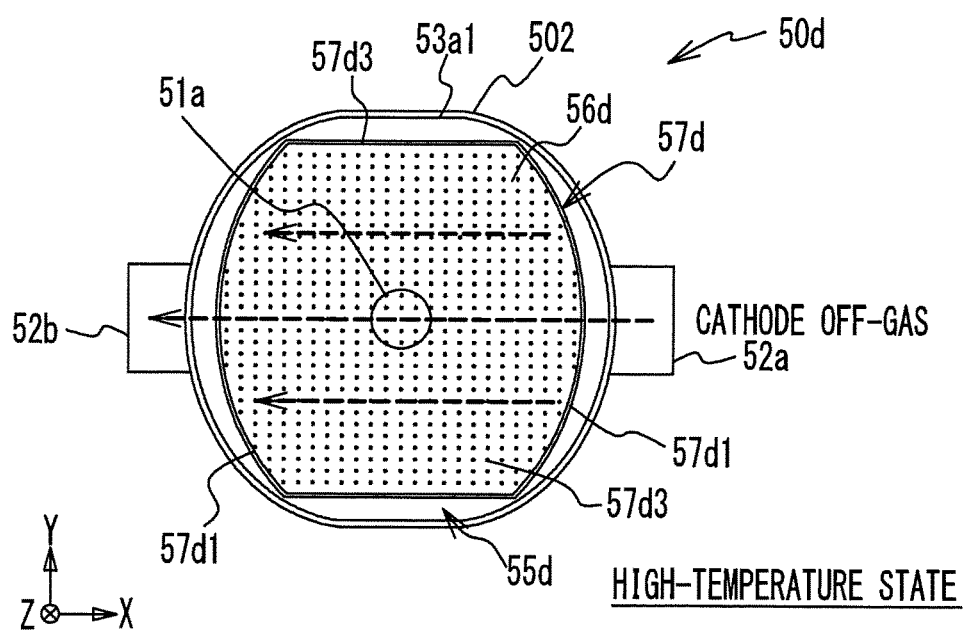
FIGS. 7A and 7B are explanatory views of a humidifier.
Figure 7B:
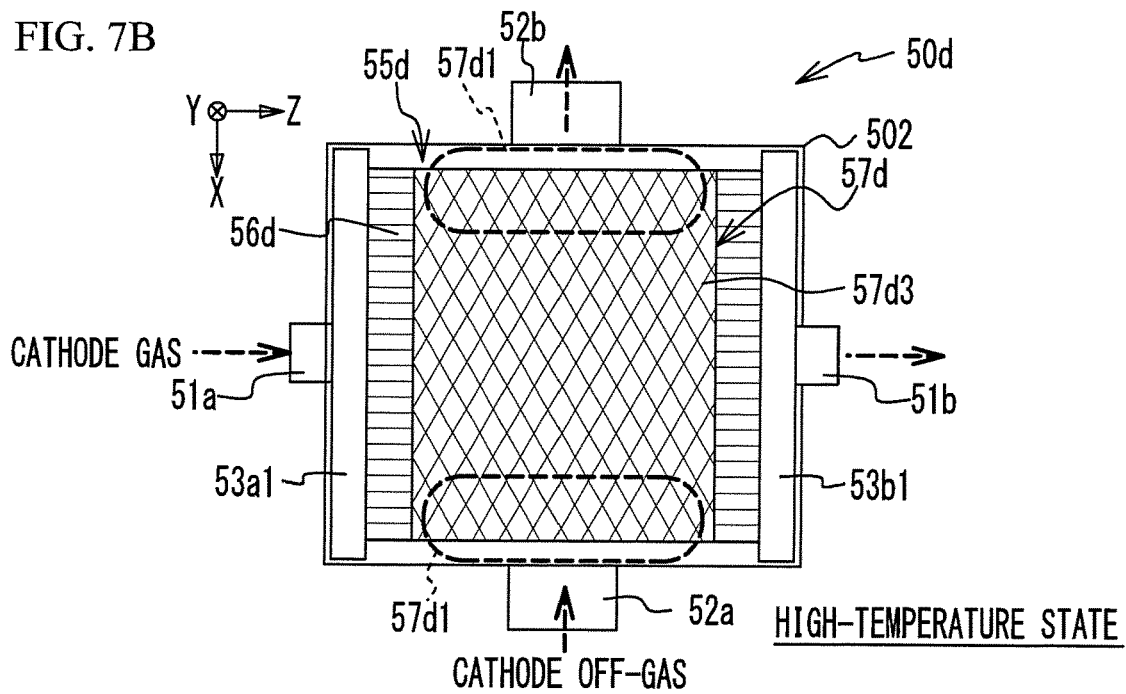

FIGS. 7A and 7B are explanatory views of a humidifier 50d according to a variation. The humidifier 50d includes a case 502, the gas inlet 51a, the gas outlet 51b, the off-gas inlet 52a, the off-gas outlet 52b, a distribution pipe 53a1, a junction pipe 53b1, and a moisture permeable unit 55d. The case 502 houses the distribution pipe 53a1, the junction pipe 53b1, and the moisture permeable unit 55d. The case 502 has a substantially columnar shape and a substantially elliptical shape when viewed in the Z direction. The distribution pipe 53a1 and the junction pipe 53b1 each have a plate shape that is thin in the Z direction, and each have a substantially elliptical shape when viewed in the Z direction so as to correspond to the shape of the case 502. The moisture permeable unit 55d is arranged between the distribution pipe 53a1 and the junction pipe 53b1.

The moisture permeable unit 55d has hollow fiber membranes 56d and a single temperature sensitive member 57d. The hollow fiber membranes 56d extending in the Z direction are arranged substantially in parallel to one another. One ends of the hollow fiber membranes 56d are fixed to the distribution pipe 53a1, and the other ends are fixed to the junction pipe 53b1. In addition, the distribution pipe 53a1 is provided with a flow path communicating with the inside of the gas inlet 51a and also communicating with the insides of the hollow fiber membranes 56d. Likewise, the junction pipe 53b1 is provided with a flow path communicating with the inside of the gas outlet 51b and also communicating with the insides of the hollow fiber membranes 56d. The hollow fiber membrane 56d has a cylindrical shape with a diameter smaller than the diameter of the moisture permeable membrane 56 described above. The hollow fiber membrane 56d is an example of a moisture permeable member having a tubular shape.

The cathode gas flows through the gas inlet 51a, the distribution pipe 53a1, the hollow fiber membranes 56d, the junction pipe 53b1, and the gas outlet 51b, in this order. The gas inlet 51a, the distribution pipe 53a1, the junction pipe 53b1, and the gas outlet 51b are an example of a first flow path portion in which one of cathode gas to be supplied to the fuel cell 20 and cathode off-gas discharged from the fuel cell 20 flows inside the hollow fiber membranes 56d each having a tubular shape.

The temperature sensitive member 57d has a substantially tubular shape, bundles the hollow fiber membranes 56d, and is a metal mesh. Therefore, the temperature sensitive member 57d is an example of a porous body partially exposing the hollow fiber membranes 56d. The temperature sensitive member 57d includes curved portions 57d1 and flat portions 57d3. The curved portions 57d1 are curved so as to grasp the hollow fiber membranes 56d. The curved portions 57d1 and the flat portions 57d3 will be described in detail later. A length of the temperature sensitive member 57d in the Z direction is smaller than that of the hollow fiber membrane 56d the longitudinal direction of which is the Z direction.

The cathode off-gas is introduced into the case 502 from the off-gas inlet 52a, and flows around the moisture permeable unit 55d, and is discharged from the off-gas outlet 52b. Since the temperature sensitive member 57d is the mesh, a part of the cathode off-gas flows inside the temperature sensitive member 57d from mesh gaps thereof, and flows outside the hollow fiber membranes 56d. The off-gas inlet 52a and the off-gas outlet 52b are an example of a second flow path portion in which the other of the cathode gas and the cathode off-gas flows outside the hollow fiber membranes 56d within the case 502.

Here, the hollow fiber membrane 56d has a cylindrical shape having a diameter smaller than the diameter of the moisture permeable membrane 56 described above, and water molecules move within the membrane, depending on a difference in water vapor partial pressures of gases flowing thereinside and thereoutside. The cathode gas flows inside the hollow fiber membranes 56d and the cathode off-gas flows thereoutside, and then moisture moves from the cathode off-gas to the cathode gas through the hollow fiber membranes 56d, which humidifies the cathode gas. Also, the hollow fiber membranes 56d increase the effective membrane area per unit volume.

The curved portions 57d1 of the temperature sensitive member 57d are curved and face each other through the hollow fiber membranes 56d. In other words, the hollow fiber membranes 56d are positioned inside the two curved portions 57d1 that are curved so as to protrude outside. The flat portions 57d3 each have a substantially flat shape and face each other through the hollow fiber membranes 56d. The curved portions 57d1 are deformable in response to the temperature, and each curvature thereof increases in the low-temperature state as compared with the high-temperature state. Additionally, the flat portion 57d3 slightly expands and contracts according to the temperature, but the curvature does not substantially change.

Figure 7C:
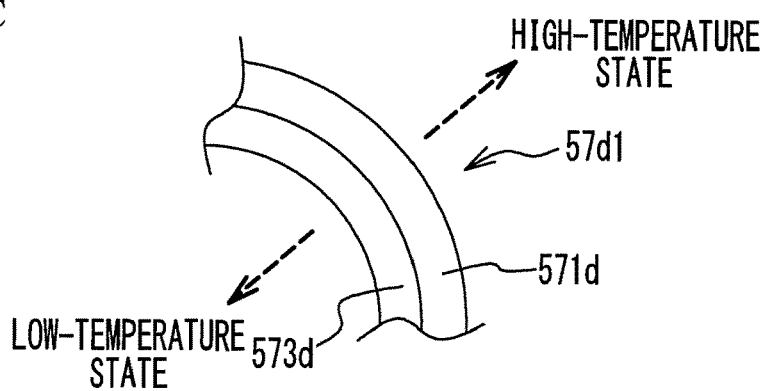
FIG. 7C is a partially enlarged view of a curved portion of a temperature sensitive member according to a variation.

FIG. 7C is a partially enlarged view of the curved portion 57d1 of the temperature sensitive member 57d. The curved portion 57d1 is a bimetal that is formed by bonding two metal meshes 571d and 573d having different linear expansion coefficients. The mesh 571d is positioned outside the curved mesh 573d, and the mesh 573d is positioned on the hollow fiber membrane 56d side. The mesh 571d is arranged at a position so as not to contact with the hollow fiber membranes 56*d*. The linear expansion coefficient of the mesh 571*d* is smaller than that of the mesh 573*d*. For this reason, the difference in expansion amount between the meshes 573*d* and 571*d* increases in the high-temperature state, and then the curvature of the curved portion 57*d*1 decreases. As compared with the high-temperature state, in the low-temperature state, the difference in the expansion amount between the meshes 573*d* and 571*d* decreases, and then the curvature of the curved portion 57*d*1 increases. That is, the curvature of the curved portion 57*d*1 increases as the temperature decreases.

Figure 8A:
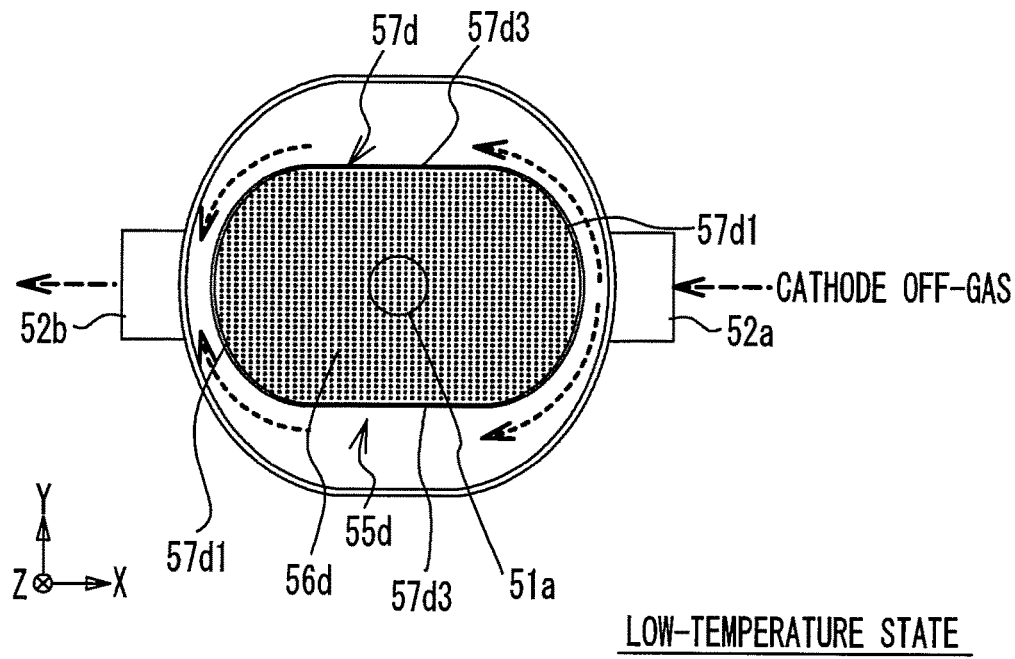
FIGS. 8A and 8B are explanatory views of the humidifier in a low-temperature state.
Figure 8B:
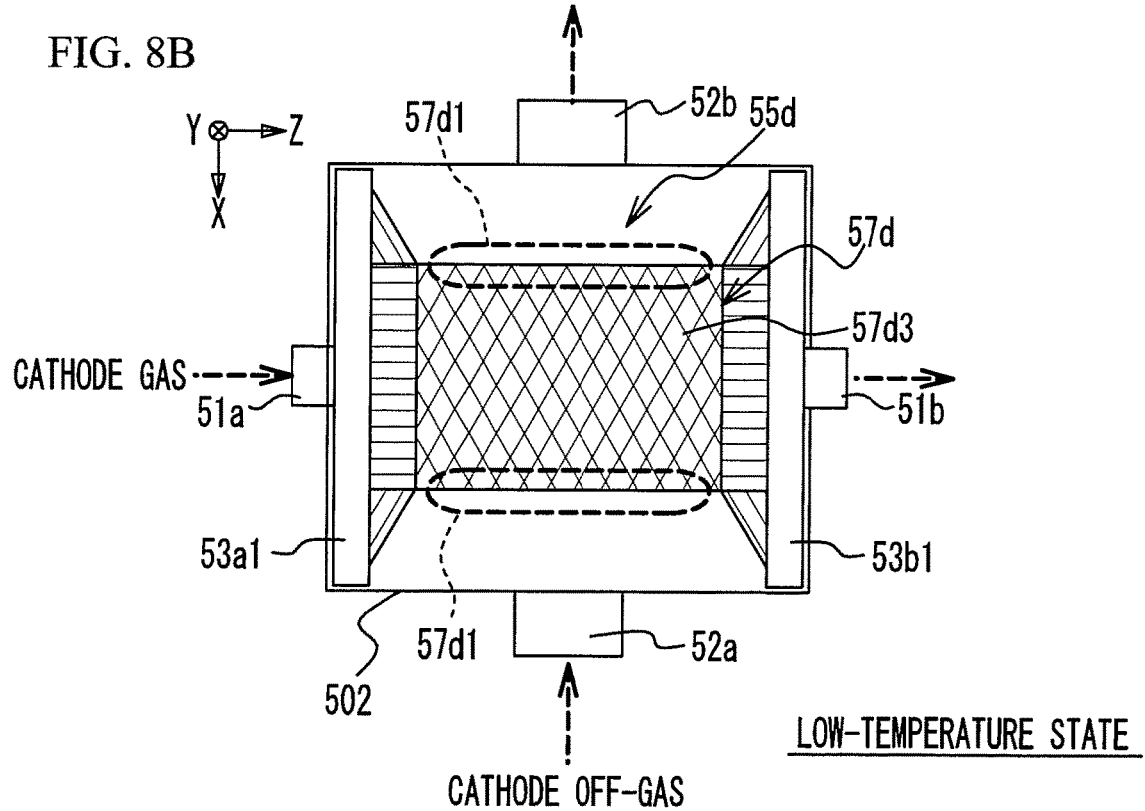
Figure 9A:
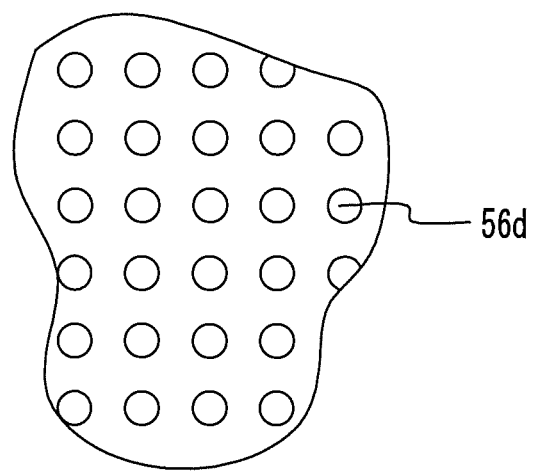
FIGS. 9A and 9B are respectively views illustrating gaps among the hollow fiber membranes in a high-temperature state and in a low-temperature state of curved portions.
Figure 9B:
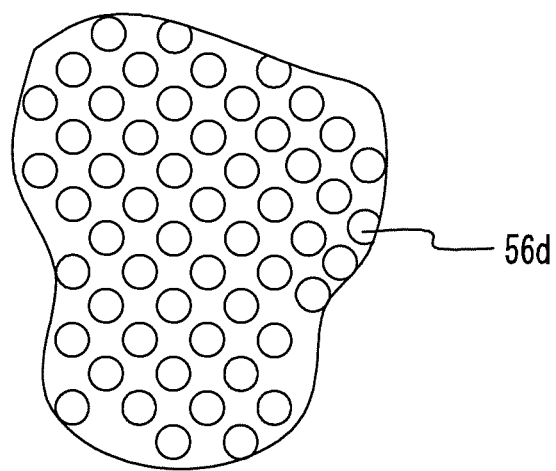

FIGS. 8A and 8B are explanatory views of the humidifier 50*d* in the low-temperature state. As described above, the curvature of the curved portion 57*d*1 is larger in the low-temperature state than in the high-temperature state, and then the hollow fiber membranes 56*d* are deformed and partially crushed by the temperature sensitive member 57*d*. FIGS. 9A and 9B are respectively views illustrating gaps among the hollow fiber membranes 56*d* in the high-temperature state and in the low-temperature state of the curved portions 57*d*1. In the high-temperature state, the gaps among the hollow fiber membranes 56*d* are relatively large, which secures the flow rate of the cathode off-gas flowing through the gaps among the hollow fiber membranes 56*d*. In the low-temperature state, the curvature of the curved portion 57*d*1 is changed to decrease the gaps among the hollow fiber membranes 56*d*, which increases the pressure loss of the cathode off-gas flowing through the gaps among the hollow fiber membranes 56*d*. Thus, the flow rate of the cathode off-gas flowing through the gaps among the hollow fiber membranes 56*d* decreases. Therefore, the curved portion 57*d*1 is deformed such that the gaps among the hollow fiber membranes 56*d* decrease as the temperature of the curved portions 57*d*1 decrease, which decreases the humidification amount of the cathode gas. Since a pressure of the cathode gas is higher than that of the cathode off-gas due to the compression of the compressor 33 and the cathode gas flows inside the hollow fiber membrane 56*d*, the hollow fiber membranes 56*d* are not crushed, even when the hollow fiber membrane 56*d* are compressed and deformed as illustrated in FIG. 8B.

The temperature sensitive member 57*d* may be provided with only one curved portion 57*d*1 deformable in response to the temperature. An element for heating or cooling the curved portion 57*d*1 may be provided.

Although some embodiments of the present invention have been described in detail, the present invention is not limited to the specific embodiments but may be varied or changed within the scope of the present invention as claimed.

In the embodiment and the variations described above, the cathode off-gas may flow inside the tubular moisture permeable member, and the cathode gas may flow outside the tubular moisture permeable member. In this case, when the gap between the moisture permeable members is small, the flow rate of the cathode gas flowing through the gap between the moisture permeable members decreases, which decreases the humidification amount of the cathode gas. When the gap between the moisture permeable members is large, the flow rate of the cathode gas flowing through the gap between the moisture permeable members increases, which increases the humidification amount of the cathode gas. Also in this case, the humidification amount of the cathode gas is suitably adjusted.

In the embodiment and the variations described above, the bimetal is described as an example of the temperature sensitive member, but the temperature sensitive member is not limited thereto. The temperature sensitive member may be, for example, a shape memory alloy that is deformable in response to temperature. Also in the case of the shape memory alloy, as illustrated in FIGS. 2A to 6D, the shape memory alloy is formed such that the curvature thereof decreases and the gap between the moisture permeable membranes 56 decreases as the temperature of the shape memory alloy decreases. In the examples of FIGS. 7A to 8B, the shape memory alloy is formed such that the curvature thereof increases and the gap between the hollow fiber membranes 56*d* decreases as the temperature of the shape memory alloy decreases. Further, a part of the single temperature sensitive member may be bimetal, and the other portion may be a shape memory alloy. Also in this case, the bimetal and the shape memory alloy may be deformed in cooperation with each other so as to decrease the gap between the moisture permeable members as the temperature of the temperature sensitive member decreases.

What is claimed is:

1. A humidifier comprising:
   moisture permeable members each having a tubular shape;
   a case housing the moisture permeable members;
   a first flow path portion in which one of cathode gas to be supplied to a fuel cell and cathode off-gas discharged from the fuel cell flows inside the moisture permeable members;
   a second flow path portion in which the other of the cathode gas and the cathode off-gas flows outside the moisture permeable members within the case; and
   a temperature sensitive member attached to at least one of the moisture permeable members, deformable in response to temperature, and deforming so as to decrease a gap between the moisture permeable members as the temperature decreases,
   wherein the temperature sensitive member includes at least one of a bimetal and a shape memory alloy.

2. The humidifier of claim 1, wherein
   the moisture permeable member is a moisture permeable membrane, and
   the temperature sensitive member is attached to at least one of an inside and an outside of a curved portion of the moisture permeable membrane.

3. The humidifier of claim 1, wherein
   the moisture permeable members are hollow fiber membranes, and
   the temperature sensitive member is curved so as to grasp the hollow fiber membranes.

4. The humidifier of claim 1, further comprising an element configured to perform at least one of heating and cooling the temperature sensitive member.

5. The humidifier of claim 1, wherein the temperature sensitive member is a porous body partially exposing the moisture permeable member.

6. A fuel cell system comprising:
   a fuel cell; and
   a humidifier,
   wherein the humidifier includes:
   moisture permeable members each having a tubular shape;
   a case housing the moisture permeable members;
   a first flow path portion in which one of cathode gas to be supplied to
   a fuel cell and cathode off-gas discharged from the fuel cell flows inside the moisture permeable members;

a second flow path portion in which the other of the cathode gas and the cathode off-gas flows outside the moisture permeable members within the case; and a temperature sensitive member attached to at least one of the moisture permeable members, deformable in response to temperature, and deforming so as to decrease a gap between the moisture permeable members as the temperature decreases, wherein the temperature sensitive member includes at least one of a bimetal and a shape memory alloy.

* * * * *